(12) United States Patent
Johnson

(10) Patent No.: US 6,510,742 B1
(45) Date of Patent: Jan. 28, 2003

(54) SENSOR FORMED ON SILICON ON INSULATOR STRUCTURE AND HAVING REDUCED POWER UP DRIFT

(75) Inventor: Russell L. Johnson, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/024,815

(22) Filed: Dec. 18, 2001

(51) Int. Cl.7 .................................................. G01L 9/16
(52) U.S. Cl. ......................................................... 73/754
(58) Field of Search .......................... 73/179, 384, 753, 73/754; 257/231, 734, 798; 437/901; 200/19 R, 20, 52 R

(56) References Cited

U.S. PATENT DOCUMENTS 6,065,346 A * 5/2000 Voegele et al. ................ 73/754

* cited by examiner

*Primary Examiner*—William Oen
(74) *Attorney, Agent, or Firm*—Dennis C. Bremer

(57) ABSTRACT

A semiconductor structure includes an upper and a lower layer of semiconductor material separated by a layer of insulation material. Resistors formed in the upper layer are connected into a Wheatstone bridge arrangement having an output. A first voltage provides power to the bridge. A second voltage connected to the lower layer of semiconductor material has a value selected to reduce the drift of the output following power up of the sensor.

13 Claims, 2 Drawing Sheets

SENSOR FORMED ON SILICON ON INSULATOR STRUCTURE AND HAVING REDUCED POWER UP DRIFT

BACKGROUND OF THE INVENTION

The present invention relates generally to semiconductor-based sensors and specifically to silicon on insulator (SOI) based sensors.

A diaphragm type silicon based pressure sensor will be used as an example to describe a problem with sensors in the past. Such pressure sensors typically include piezoresistors positioned to sense strain associated with pressure and arranged in a Wheatstone bridge to which a direct current voltage is applied. The output voltage of the bridge is representative of the pressure that is being sensed. A power up drift (PUD) phenomena has been observed in silicon-based sensors that is not explained by a small thermal rise that may occur after power is applied to the sensor. A PUD effect as great as 0.05% of full scale has been observed.

The PUD phenomena is apparently a result of mobile ions present either on the surface of the silicon chip or within the silicon dioxide passivation layer, which have one preferred configuration with power off and a second preferred configuration when power is applied. In other words, these ions are mobile in response to the application of voltage to the silicon chip. As the charges move they apparently affect the characteristics of the circuit elements on the chip. The charges may reside in any of a number of locations in the integrated circuit. They may be in the silicon, in insulating layers on or under the silicon, at the interfaces between two of these layers, or at the surface of the silicon chip. Sensors, including pressure sensors, are often designed with a bridge configuration to minimize this and other performance limitations. In a bridge configuration, the change of any one element resulting from the redistribution of charges on power up is not significant as long as its balancing element undergoes the same change. Therefore, great care is usually taken in the design of a sensor to insure that the individual elements of the bridge are as identical as possible. The power-up drift of the bridge output "resets" itself after the power is removed to the value that existed before power was applied. The time required after power is applied for the PUD to stabilize is typically less than the time required for the sensor to "reset" after the power is removed.

Silicon-on-insulator (SOI) based sensors offer several performance advantages over conventional bulk-silicon based sensors due to the elimination of the p-n junction. In bulk silicon, the p-type piezoresistors are implanted or diffused into an n-type epitaxial layer, which results in the formation of a p-n junction. The reverse current leakage of a p-n junction increases with temperature (approximately doubles every 10° C.), which ultimately limits the operating temperature to typically 125° C. To minimize the effect of the reverse current leakage, which typically shunts the piezoresistor element, on performance, the value of the piezoresistive bridge elements are typically limited to 40K ohm maximum to maintain quality performance over temperature.

In SOI, however, the piezoresistor elements are isolated from the silicon substrate by an insulation layer thereby eliminating the p-n junction and it's associated reverse leakage current. The high temperature operating limit of SOI material is therefore significantly increased to a range of 200° C. to 400° C. depending on the metalization system, packaging and materials and other variables.

SOI sensors also allow the piezoresistive bridge impedance to be increased to as high as 200K ohm with equivalent performance. The higher impedance reduces the sensor power requirements proportionally. For example, increasing the bridge impedance from 40K ohm to 200K ohm reduces the sensor power requirement by a factor of five. These larger impedance values can be achieved without significantly increasing the physical area of the piezoresistor element. This is accomplished in two ways. First, the effective thickness of the piezoresistor element can be formed to be significantly thinner than that formed in bulk silicon which results in a higher sheet resistivity (ohms per square) that is inversely proportional to the thickness. Secondly, the impurity concentrations of the diffused or implanted piezoresistor can be reduced, without performance degradation, which also results in an increase in sheet resistivity. The combination of the two methods can result in a five-fold increase in sheet resistivity for the same form of the resistor area.

The combination of high temperature operation and power reduction allows SOI based sensors to be used in many new applications that are beyond the capability of bulk-silicon based sensors. Where the sensor application is such that reduced measurement accuracy is acceptable or where a period of warm-up time is permissible, the power-up-drift phenomena may not be a problem. However, numerous applications require the sensor to met specifications within a very short time, (for example, a few seconds or less,) after power is applied. Thus there is a need for a silicon-on-insulator sensor configuration that greatly reduces the cause(s) of power-up drift.

BRIEF SUMMARY OF THE INVENTION

The present invention solves these and other needs by providing a solution for reducing the power up drift observed in the output of Wheatstone bridge configurations of SOI based sensors. In the preferred embodiment of the present invention, a sensor has a layer of silicon formed on a silicon substrate, the layer of silicon having an insulation layer dividing the layer into an upper and lower layer. Within this upper layer, a plurality of resistors are formed, connected in a bridge arrangement. The preferred embodiment also includes a means for supplying a first voltage to the bridge arrangement and a means for supplying a second voltage to the lower layer of silicon. The level of the second voltage is selected to reduce the power up drift.

DETAILED DESCRIPTION OF THE INVENTION

Figure 1:
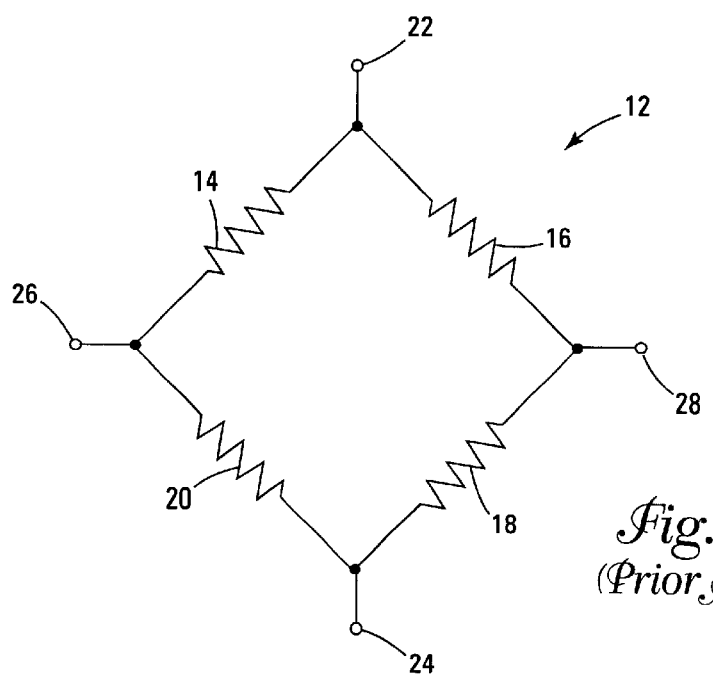
FIG. 1 shows a schematic drawing of a sensor bridge arrangement as found in the prior art.

A sensor in accordance with the principles of the present invention is shown in the drawings and generally designated as reference numeral 10. The present invention will be described relative to its application in a silicon based pressure sensor, but it is to be understood that it may be used in other applications, for example, in a temperature sensor. Sensor 10 includes a network or bridge 12 as shown in FIG. 1 having one or more piezoresistive devices on a diaphragm, typically of silicon. In the preferred embodiment, four such piezoresistive devices are shown in the form of a bridge. These four elements are shown as resistors 14, 16, 18, 20. Preferably resistors 14 and 18 are positioned radially to the diaphragm and resistors 16 and 20 are positioned tangential to the diaphragm. In this way resistors 14 and 18 will increase in resistance with pressure while resistors 16 and 20 will decrease in resistance for the case where pressure is applied to the active side of the diaphragm. In typical operation a constant input voltage is applied to terminal 22 and terminal 24 is at ground. This results in an output voltage related to the pressure on the diaphragm appearing between output terminals 26 and 28. Compensation networks, for example to compensate for temperature changes will also typically be used, but are not shown for simplicity.

Figure 2:
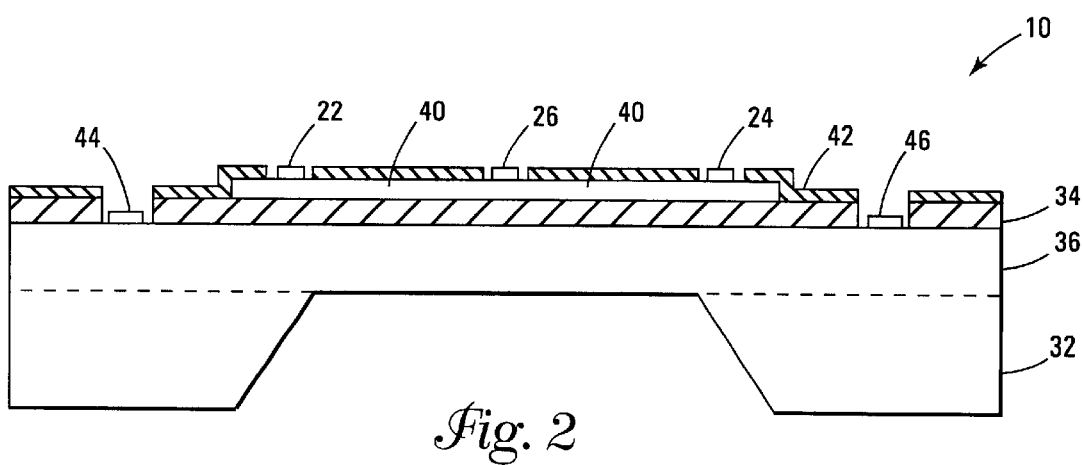
FIG. 2 shows a cross sectional view of a sensor according to the teachings of the present invention.

The present invention applies to sensors formed in semiconductor or insulator structures, for example, a silicon-on-insulator (SOI) structure. SOI structures may be formed by various well-known techniques and the present invention may be practiced regardless of the method by which the SOI structure was formed. A specific technique will be described with reference to FIG. 2. A wafer having an n epitaxial (n-epi) layer 36 on a p++ substrate is used as a starting wafer. A silicon dioxide layer 34 is formed beneath the top surface of the n epi layer by high energy oxygen implantion as in a SIMOX process. The resulting thin epi layer above oxide layer 34 is used as a seed layer to grow an increased thickness of n epi. A thermal oxide layer is then grown on the upper n epi layer and consumes a portion of this layer. This thermal oxide layer is patterned to allow formation of resistors and boron ions are implanted into portions of this remaining thickness of the upper n epi layer to form p+ silicon. A photomask and cut process is then used to form individual p+ piezoresistors 40 located as desired for the specific bridge and diaphragm configurations. A thermal oxide layer 42 is then formed and a contact cut process and metallization is used to form contact 22 at the top, contact 26 at the center or midpoint, and contact 24 at the bottom of bridge 12. Contact 44 to epi layer 36 near contact 22 or the top of bridge 12 and contact 46 to epi layer 36 near contact 24 or the bottom of the bridge are also formed. Contacts 44 and 46 are used according to the principles of the present invention to apply a voltage to lower epi layer 36, which is electrically isolated by oxide layer 34 from piezoresistors 40, but establishes a field that can be used to affect the PUD.

Applying a voltage to the epi layer may provide various configurations:

EXAMPLE 1

Figure 3:
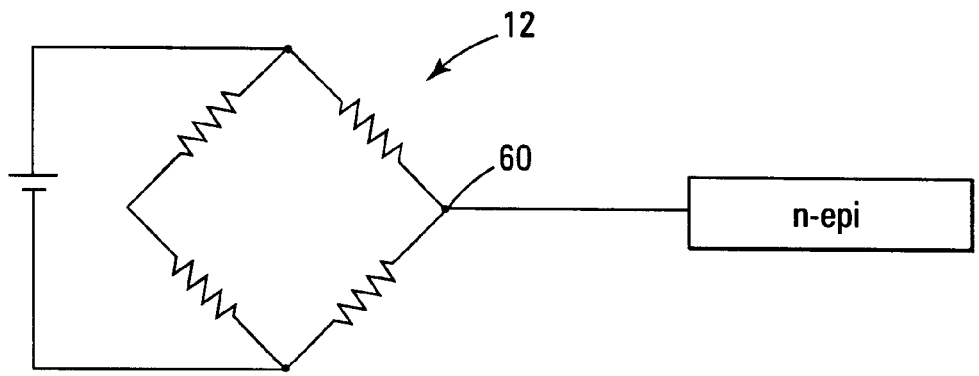
FIGS. 3 and 4 are schematic drawings showing additional details related to the use of the sensor of FIG. 2.

The voltage at a midpoint, 60, of the bridge may be connected to the epi layer as illustrated in FIG. 3.

EXAMPLE 2

Apply a constant voltage (Vepi) to the n-epi layer that is of a value between the bridge excitation voltage and ground and that is equal to the bridge voltage ($V_{bridge}$) times the quantity of one minus the ratio of the magnitude of the drift with the n-epi at the bridge excitation voltage (PUD @ $V_{bridge}$) divided by the sum of the magnitudes of the drift with the n-epi at the bridge excitation voltage (PUD @ $V_{bridge}$) and at power ground (PUD @ ground).

In Equation form:

$$Vepi = V_{bridge}\left(1 - \frac{|PUD@V_{bridge}|}{|PUD@V_{bridge}| + |PUD@ground|}\right) \quad (1)$$

For example: If $V_{bridge}$=5 volts; |(PUD@$V_{bridge}$)|=3 units; and |(PUD@ground)|=2 units
Then: $V_{epi}$=5(1⅗)=2 volts
This voltage can be provided in a variety of ways.

Figure 4:
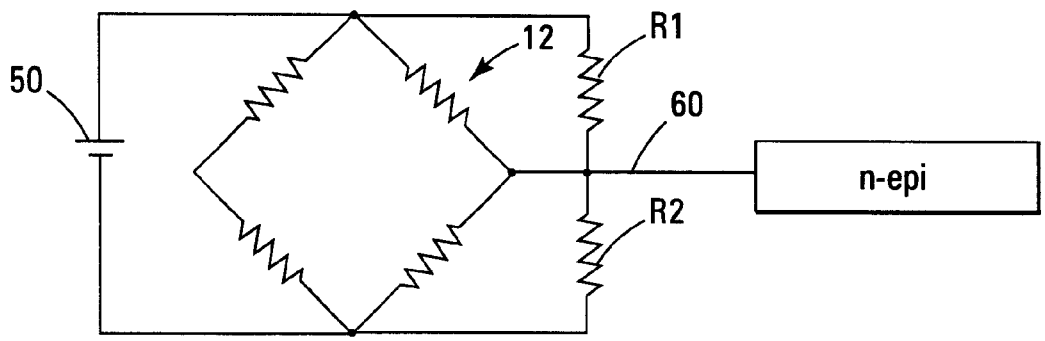

For example, by providing a resistor divider network as shown in FIG. 4 consisting of resistors R1 and R2 connected in series where the open end of R1 is connected to bridge voltage 50 and the open end of R2 is connected to ground. Midpoint 52 of the resistor divider network is then connected to the n-epi layer. In determining the resistor values, first select the value for the sum of R1+R2 (10K OHMS for example). Then the value of R2 is determined by:

$$R2 = (R1 + R2)\left(1 - \frac{|PUD@V_{bridge}|}{|PUD@V_{bridge}| + |PUD@ground|}\right) \quad (2)$$

For example: If (R1+R2) is set to 10K OHMS; |PUD @ $V_{bridge}$|=3 units; and |PUD @ ground|=2 units
Then: R2=10(1⅗)=4K OHMS and R1=10K–R2–6K OHMS The value of R1+R2 can be even larger since the impedance looking into the n-epi layer is at least in the range of $10^9$ ohms. Alternatively a voltage source set to the value as determined by equation (1) can be applied directly to the n-epi layer.

EXAMPLE 3

Figure 5:
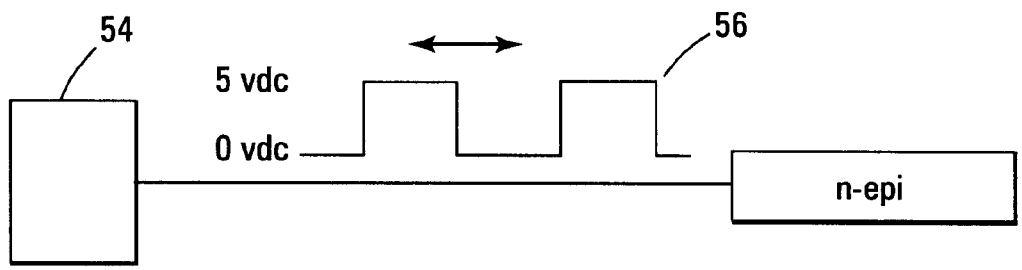
FIG. 5 is a diagrammatic representation showing additional details of an alternative arrangement related to the use of the sensor of FIG. 2.
Figure 3:
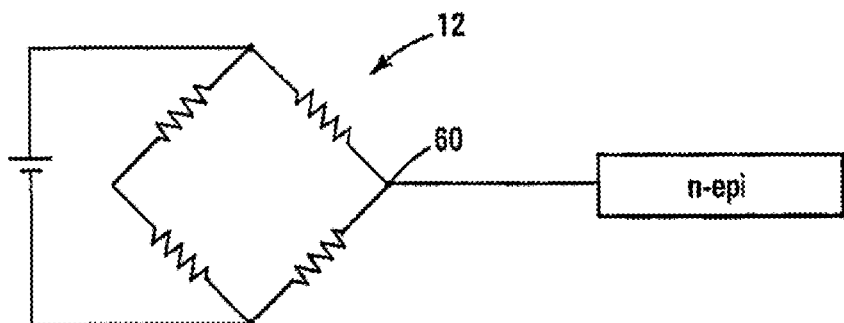
Figure 4:
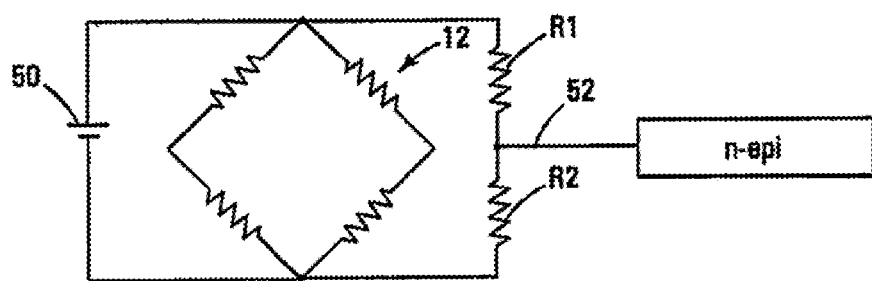
Figure 5:
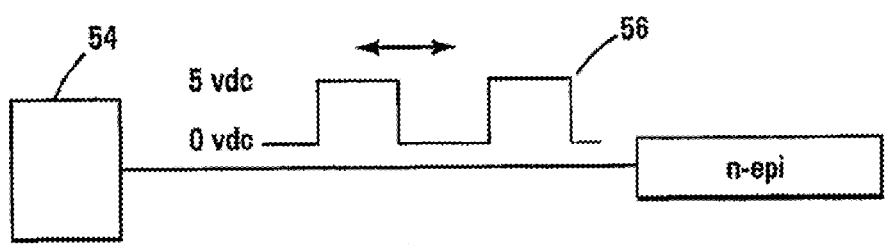
Figure 3:
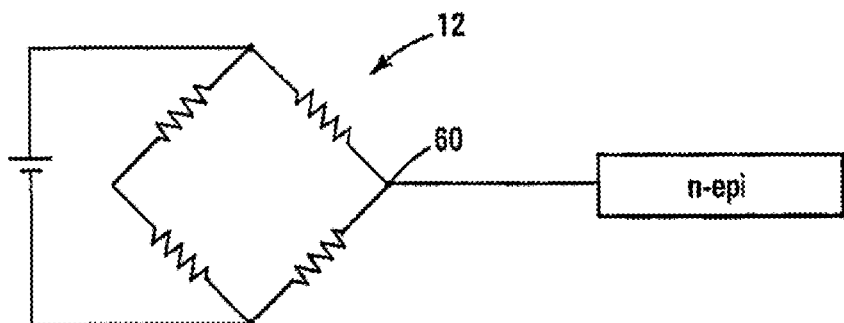
Figure 4:
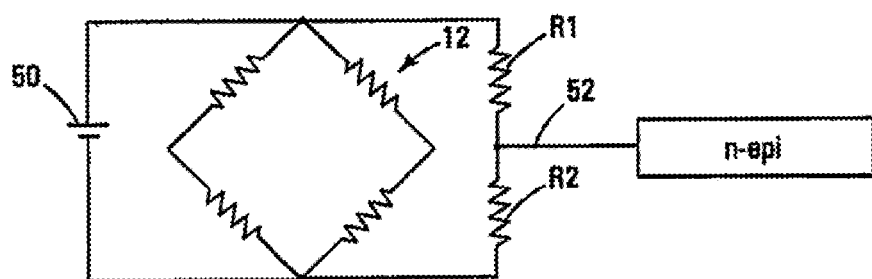
Figure 5:
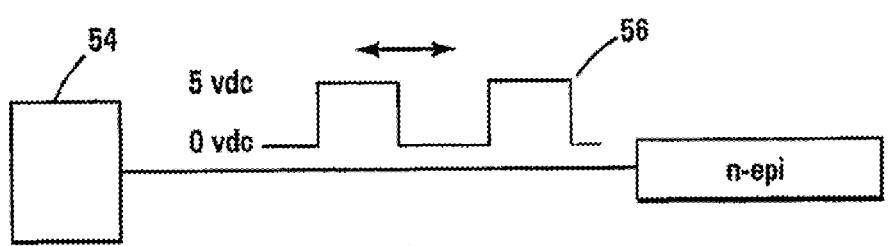

Operate the n-epi layer as shown in FIG. 5 with a low frequency pulse width modulated voltage signal 56 from a source 54 where the high state is equal to the $V_{bridge}$ voltage, for example, 5 volts direct current, and the low state is equal to ground. Source 54 provides a square wave voltage 56 and has an adjustable pulse width. The ratio of the pulse width with respect to the total period, or the duty cycle, is determined similar to Example 1 above. For example: If |PUD @ $V_{bridge}$|=3 units; and |PUD @ ground|=2 units, then the Pulse Width Ratio=(1⅗)=0.40

A PW Ratio of 0.40 means that over the period of one cycle, the n-epi layer will have $V_{bridge}$ applied for 40% of the time and a ground potential for 60% of the time. Implementation of this concept can be achieved by using conventional circuit mechanization to achieve the desired low frequency digital type signal with pulse width adjustment capability.

Testing also shows that the polarity of the power-up drift is dependent on the voltage potential applied to n-epi layer 36 indicating that the power-up drift mechanism is ionic in nature. The polarity of the drift with the n-epi layer equal to the bridge excitation voltage is opposite in polarity to the drift with the n-epi connected to power ground.

For bulk silicon based pressure sensors, P-type resistors are implanted directly into an N-type epitaxial (n-epi) layer resulting in a p-n junction. Normally, the n-epi layer is electrical tie to the bridge excitation voltage via a contact cut made to the n-epi layer. This provides a reverse bias to the p-n junction. The n-epi layer cannot be tied to a voltage less than the bridge excitation voltage for this would forward bias the p-n junction and the sensor would not function correctly.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The embodiments of the invention in which an exclusive property or right is claimed are defined as follows:

1. A sensor comprising:
   a silicon substrate of a first conductivity type;
   a layer of silicon of a second conductivity type formed on said silicon substrate;
   an insulation layer within said layer of silicon and dividing said layer of silicon into an upper layer and a lower layer;
   a plurality of resistors formed in said upper layer of silicon and interconnected into a bridge arrangement, said bridge arrangement having an output;
   means for connecting a first voltage to said bridge arrangement; and
   means for connecting a second voltage to said lower layer of silicon, with a value of said second voltage being selected to reduce power up drift.

2. Sensor of claim 1, wherein said plurality of resistors form a Wheatstone bridge having a top, a bottom, and a midpoint, with said first voltage being applied at said top and said bottom of said bridge and said second voltage being approximated equal to a voltage at a midpoint of said bridge.

3. Sensor of claim 1 wherein said second voltage is determined as a function of an observed drift when said second voltage is equal to said first voltage and the observed drift when said second voltage is equal to ground.

4. Sensor of claim 3 wherein said second voltage is determined by multiplying said first voltage by $$\left(1 - \frac{|PUD@V_{bridge}|}{|PUD@V_{bridge}| + |PUD@ground|}\right).$$

wherein $|PUD @ V_{bridge}|$=the observed drift when said second voltage is equal to said first voltage; and $|PUD @ ground|$=the observed drift when said second voltage is equal to ground.

5. Sensor of claim 1 wherein said second voltage is equal to said first voltage times the quantity of one minus the ratio of a first value of a drift with said second layer connected to said first voltage, divided by the sum of said first value and a second value of a drift with said second layer connected to ground.

6. Sensor of claim 1 wherein said second voltage has a high state during a first period of time equal to said first voltage and a low state during a second period of time equal to ground with the ratio of said first period of time to a total cycle time equal to one minus the ratio of a first value of drift with said second voltage at a high level divided by the sum of said first value of drift plus a second value of drift with said second voltage at ground.

7. Sensor of claim 1 further comprising a resistor voltage divider having said first voltage as an input and said second voltage as an output.

8. A sensor comprising:
   a first layer of a semiconductor material;
   an insulation layer formed on said first layer;
   a second layer of a semiconductor material formed on said insulation layer;
   a plurality of resistors formed in said second layer of semiconductor material and interconnected into a bridge arrangement having an output;
   means for connecting a first voltage to said bridge arrangement; and
   means for connecting a second voltage to said first layer with a value of said second voltage being selected to reduce power up drift in said output during a period of time immediately following connection of said first voltage.

9. A sensor comprising:
   a silicon substrate of a first conductivity type;
   a layer of silicon of a second conductivity type formed on said silicon substrate;
   an insulation layer within said layer of silicon and dividing said layer of silicon into an upper layer and a lower layer;
   a plurality of resistors formed in said upper layer of silicon and interconnected into a bridge arrangement, said bridge arrangement having an output;
   means for connecting a first voltage to said bridge arrangement; and
   means for connecting a second voltage to said lower layer of silicon, with a value of said second voltage being selected to reduce power up drift and being determined as a function of an observed drift when said second voltage is equal to said first voltage and the observed drift when said second voltage is equal to ground.

10. Sensor of claim 9 wherein said second voltage is determined by multiplying said first voltage by $$\left(1 - \frac{|PUD@V_{bridge}|}{|PUD@V_{bridge}| + |PUD@ground|}\right)$$

wherein $|PUD @ V_{bridge}|$=the observed drift when said second voltage is equal to said first voltage;
and $|PUD @ ground|$=the observed drift when said second voltage is equal to ground.

11. Sensor of claim 9 wherein said second voltage is equal to said first voltage times the quantity of one minus the ratio of a first value of a drift with said second layer connected to said first voltage, divided by the sum of said first value and a second value of a drift with said second layer connected to ground.

12. Sensor of claim 9 wherein said second voltage has a high state during a first period of time equal to said first voltage and a low state during a second period of time equal to ground with the ratio of said first period of time to a total cycle time equal to one minus the ratio of a first value of drift with said second voltage at a high level divided by the sum of said first value of drift plus a second value of drift with said second voltage at ground.

13. Sensor of claim 9 further comprising a resistor voltage divider having said first voltage as an input and said second voltage as an output.

* * * * *

UNITED STATES PATENT AND TRADEMARK OFFICE
CERTIFICATE OF CORRECTION

| | | |
|---|---|---|
| PATENT NO. | : 6,510,742 B1 | Page 1 of 2 |
| APPLICATION NO. | : 10/024815 | |
| DATED | : January 28, 2006 | |
| INVENTOR(S) | : Russell L. Johnson | |

It is certified that error appears in the above-identified patent and that said Letters Patent is hereby corrected as shown below:

In the drawings, Sheet 2, Fig. 4, delete the line between the bridge 12 and the midpoint 60 as shown in attached sheet.

In column 3, Line 50, replace "provide" with --be accomplished by--

In column 4, Line 9, replace "$1\ ^3/_5$" with --$1-^3/_5$--

In column 4, Line 25, replace "$1\ ^3/_5$" with --$1-^3/_5$--

In column 4, Line 25, replace "R2-6K" with --R2=6K--

In column 4, Line 42, replace "$1\ ^3/_5$" with --$1-^3/_5$--

In column 2, Line 5, replace "approximated" with --approximately--

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,510,742 B1
APPLICATION NO. : 10/024815
DATED : January 28, 2003
INVENTOR(S) : Russell L. Johnson It is certified that error appears in the above-identified patent and that said Letters Patent is hereby corrected as shown below:

In the drawings, Sheet 2, Fig. 4, delete the line between the bridge 12 and the midpoint 60 as shown in attached sheet.

In column 3, Line 50, replace "provide" with --be accomplished by--

In column 4, Line 9, replace "$1\ ^3/_5$" with --$1-^3/_5$--

In column 4, Line 25, replace "$1\ ^3/_5$" with --$1-^3/_5$--

In column 4, Line 25, replace "R2-6K" with --R2=6K--

In column 4, Line 42, replace "$1\ ^3/_5$" with --$1-^3/_5$--

In column 2, Line 5, replace "approximated" with --approximately--

This certificate supersedes Certificate of Correction issued September 4, 2007.

Signed and Sealed this

Ninth Day of October, 2007

JON W. DUDAS
*Director of the United States Patent and Trademark Office*